Aug. 20, 1957  T. D. MORGAN ET AL  2,803,399
SIMULTANEOUS EQUATION SOLVER
Filed July 23, 1951
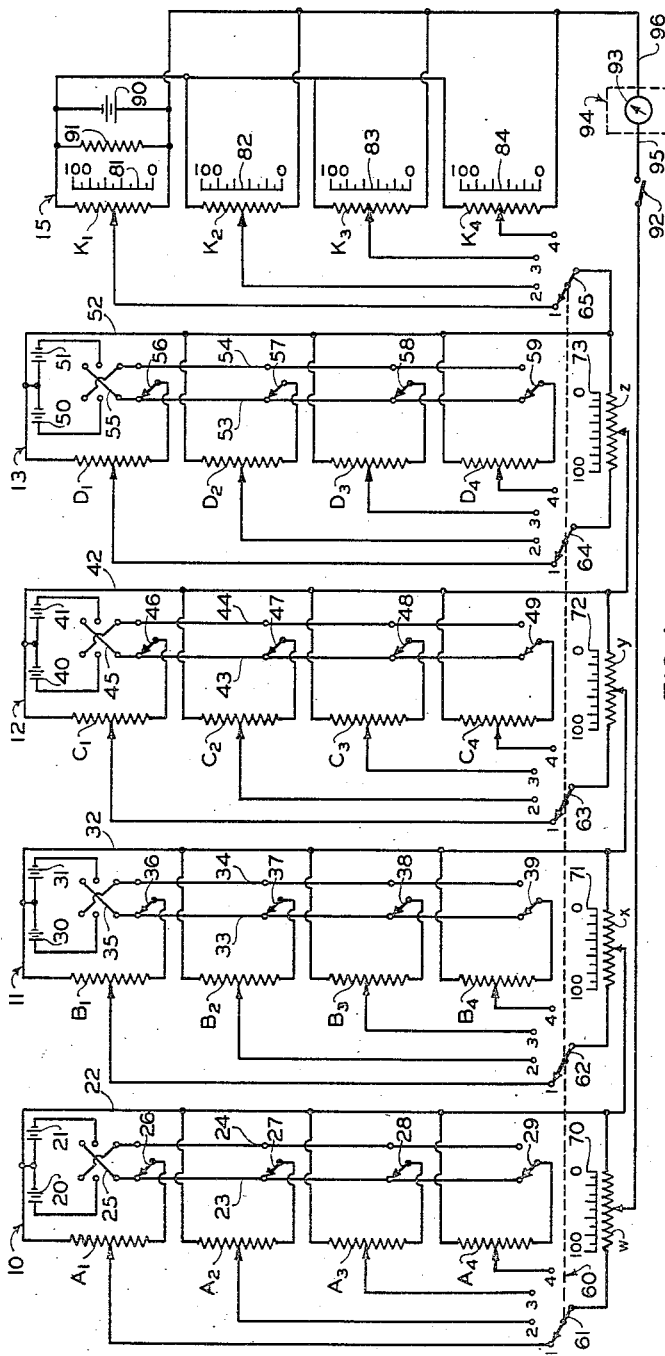
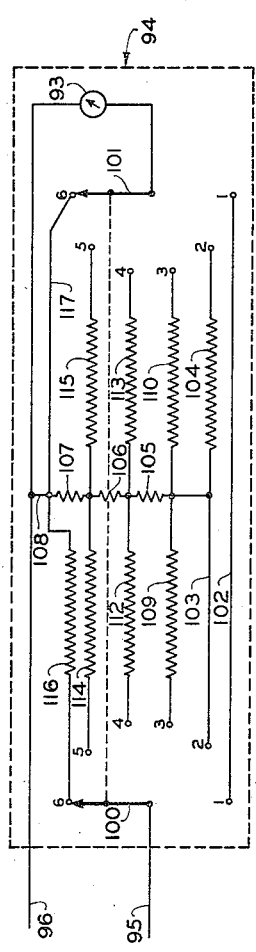
FIG. 1
FIG. 2
INVENTORS
T. D. MORGAN
W. L. MORRIS
BY
Hudson & Young
ATTORNEYS

United States Patent Office 2,803,399
Patented Aug. 20, 1957

2,803,399

SIMULTANEOUS EQUATION SOLVER

Thomas D. Morgan and William L. Morris, Bartlesville, Okla., assignors to Phillips Petroleum Company, a corporation of Delaware Application July 23, 1951, Serial No. 238,093

7 Claims. (Cl. 235—61)

This invention relates to electrical computers. In another aspect it relates to means for solving systems of simultaneous linear equations which are solvable by well known methods iteration or successive approximations.

In many fields of industrial operation there is a need for computers which are capable of accurately and rapidly solving systems of linear simultaneous equations. This is particularly true in the petroleum industry wherein analysis by infrared spectrophotometers has recently become a wide spread procedure for analyzing hydrocarbon mixtures to determine percentages of the various constituents. It is assumed that at a particular wave length each component of the mixture has a maximum extinction coefficient. Then by use of the spectrophotometer there is measured the total extinction produced by a sample of the mixture at each of the selected wave lengths of maximum extinction for the particular components. For example, if a four component mixture is to be analyzed the procedure is to determine the total absorption of the mixture at a wave length $L_1$, this wave length being chosen to create as large an extinction as possible with respect to the first component of the mixture as compared with the extinction caused by the remaining three components. In a similar manner a second extinction value is determined for the sample at a wave length $L_2$ which is chosen to cause as great an extinction as possible due to the second component of the mixture as compared with the remaining components; and in like manner additional readings are taken at wave lengths $L_3$ and $L_4$. Then, since the total extinction produced by the mixture at any wave length must be equal to the sum of the extinctions brought about by each of the components of the mixture, a set of equations can be written as follows:

$$\begin{aligned}a_1w+b_1x+c_1y+d_1z=M_1\\a_2w+b_2x+c_2y+d_2z=M_2\\a_3w+b_3x+c_3y+d_3z=M_3\\a_4w+b_4x+c_4y+d_4z=M_4\end{aligned} \quad (1)$$

In these equations $w$, $x$, $y$, and $z$ are the percents of the respective components of the mixtures; $a_1$, $a_2$, $a_3$ and $a_4$ are the extinction coefficients for component $w$ at wave lengths $L_1$, $L_2$, $L_3$ and $L_4$, respectively; $b_1$, $b_2$, $b_3$ and $b_4$ are the extinction coefficients for component $x$ at wave lengths $L_1$, $L_2$, $L_3$ and $L_4$, respectively; $c_1$, $c_2$, $c_3$ and $c_4$ are the extinction coefficients for component $y$ at wave lengths $L_1$, $L_2$, $L_3$ and $L_4$, respectively; $d_1$, $d_2$, $d_3$ and $d_4$ are the extinction coefficients for component $z$ at wave lengths $L_1$, $L_2$, $L_3$ and $L_4$, respectively; and $M_1$, $M_2$, $M_3$ and $M_4$ are the total extinction coefficients at wave lengths $L_1$, $L_2$, $L_3$ and $L_4$, respectively.

As is well known, equations of this type can be solved by the method of systematically making approximations of the percentage of each component so that successive approximations approach the correct solution to the problem, and then repeating these approximations until the difference in successive approximations becomes less than the experimental error of the original data. A decided limitation to this method of computation, however, is that considerable knowledge of mathematical procedure is required. Sets of linear simultaneous equations having fewer than four unknown quantities also can readily be solved by elementary methods of elimination and substitution or through the use of determinants. However for sets having more than four unknowns these calculations become extremely laborious and for all practical purposes are useless for industrial applications.

Thus, in order to use an infrared spectorphotometer as a tool for hydrocarbon analysis, it has become necessary to employ one of several computing devices known to the art. The majority of computers presently available consist of a plurality of potentiometer networks having electrical voltages applied thereacross. The various multiplications are performed by potentiometers connected in cascade relationship with one another, and the required additions are performed by comparing these various multiplication voltage sums against a plurality of reference voltages representing the constant terms of the equations. Operation of these computers is accomplished by inserting on appropriate potentiometers the values of the known quantities in each equation and adjusting those potentiometers representing the unknowns so as to produce a balanced condition in the system as represented by an equality of the voltages under comparison. The unknowns of the plurality of equations are successively solved for in this manner and the cycle is repeated until an ultimate value for each unknown fits all of the equations.

While these prior art computers generally have been effective in solving said simultaneous linear equations, they have been quite expensive to construct since large numbers of batteries and precision potentiometers are required to accurately establish voltages representative of the various terms in the equations. A further difficulty that has arisen in many of the prior art computers is that of accommodating negative coefficients should they be present in a particular equation. While in the aforementioned application to infrared analysis, there is no problem of negative coefficients, for other industrial application such as the determination of the percentage of components in alloys, the need for solving equations having negative coefficients has arisen.

The computer constructed in accordance with the present invention is adapted for solution of equations having either positive or negative coefficients. In addition a procedure is provided whereby the values of the different terms of the equations may accurately be established on inexpensive non-calibrated potentiometers through use of a novel comparison method.

It is, accordingly, an object of the present invention to provide simplified apparatus for solving linear simultaneous equations.

Another object is to provide a computer capable of solving linear simultaneous equations having both positive and negative coefficients.

A further object is to provide a method whereby coefficients can accurately be inserted in electrical computers without requiring the use of precision impedance elements upon which said coefficients are set.

A still further object of the invention is to provide an electrical computer of simplified construction, employing a minimum number of precision circuit components, and which is easy to operate.

Other objects, advantages, and features of this invention should become apparent from the following detailed description taken in conjunction with the accompanying drawing in which:

Figure 1 is a schematic electrical circuit diagram of a particular embodiment adapted to solve sets of four linear simultaneous equations; and Figure 2 is a schematic circuit representation of the sensitivity control used in conjunction with the galvanometer of Figure 1.

Referring now to the drawing in detail and to Figure 1 in particular, there is shown a plurality of networks 10, 11, 12, and 13; each of which is adapted for establishing reference voltages representative of corresponding coefficients in the set of equations being solved. Each network includes a pair of batteries, such as, for example, 20, 21 in network 10. Like batteries 30, 31; 40, 41; and 50, 51 are positioned in networks 11, 12, and 13, respectively. In network 10 four potentiometers $A_1$, $A_2$, $A_3$ and $A_4$ are connected in parallel relationship with said series batteries 20, 21. Each of these potentiometers has one end terminal thereof connected to a common conductor 22, which in turn is connected at one end to the center tap of batteries 20, 21. The second end terminals of each of said potentiometers $A_1$, $A_2$, $A_3$ and $A_4$ are connected through selective switches 26, 27, 28, and 29, respectively, to either of two common conductors 23 or 24, which are in turn connected through a double throw reversing switch 25 to the end terminals of batteries 20, 21, respectively. The B, C, and D potentiometers of networks 11, 12, and 13, respectively, are likewise connected in parallel relationship with the corresponding batteries in said networks. A voltage balancing network 15 includes four potentiometers $K_1$, $K_2$, $K_3$ and $K_4$, each of which is connected in parallel relationship across battery 90.

A plurality of potentiometers $w$, $x$, $y$, and $z$ are adapted to be selectively connected in cascade relationship with the individual potentiometers of networks 10, 11, 12, and 13, respectively, through ganged switching means 60 made up of individual switches 61, 62, 63, and 64 in networks 10, 11, 12, and 13, respectively. Potentiometer $w$ has one end terminal thereof connected to common lead 22 and the other end terminal is selectively connected through contacts 1, 2, 3, and 4 of switch 61 to the contactors of potentiometers $A_1$, $A_2$, $A_3$, and $A_4$, respectively. The contactor of potentiometer $w$ is connected through switch 92 and lead 95 to one terminal of a current measuring instrument such as galvanometer 93. The second terminal of galvanometer 93 is connected through lead 96 to one end terminal of battery 90 in network 15. Potentiometers $x$, $y$, and $z$ in like manner are selectively connected through switches 62, 63, and 64 to networks 11, 12, and 13, respectively. One end terminal of potentiometer $z$ is selectively connected through contacts 1, 2, 3, and 4 of switch 65 to the contactor of potentiometers $K_1$, $K_2$, $K_3$, and $K_4$, respectively. The contactor of potentiometer $z$ is connected to that end terminal of potentiometer $y$ which is not connected to switch 63; the contactor of potentiometer $y$ is connected to that end terminal of potentiometer $x$ which is not connected to switch 62; and the contactor of potentiometer $x$ is connected to that end terminal of potentiometer $w$ which is not connected to switch 61. It should thus be apparent that for any position of ganged switching means 60, the sum of the voltages appearing across networks 10, 11, 12, and 13 for a given equation is connected in opposition with a corresponding reference voltage of network 15, and any difference between these two voltages is indicated by galvanometer 93.

Potentiometers $w$, $x$, $y$, $z$, $K_1$, $K_2$, $K_3$, and $K_4$ are precision instruments provided with scales 70, 71, 72, 73, 81, 82, 83, and 84, respectively, which serve to indicate the position of the contactor of said potentiometers. In network 15 a resistor 91 is connected in parallel with potentiometer $K_1$ so as to equalize the voltage drop thereacross in comparison with the voltage drop across potentiometers $K_2$, $K_3$, and $K_4$.

Galvanometer 93 is shown as being shunted by a network 94 which is illustrated in greater detail in Figure 2. A pair of mechanically interconnected switches 100 and 101 are shown as being connected to leads 95 and to galvanometer 93, respectively. Movement of ganged switches 100 and 101 through contact points 1, 2, 3, 4, 5, and 6 serves to connect resistors having various values both in series and in shunt relationship with galvanometer 93, thereby modifying the sensitivity of this galvanometer to compensate for differences in potential applied across the terminals thereof. At position 1 galvanometer 93 is connected directly in circuit between the voltages being compared by means of lead 102, thereby giving a maximum reading for a given voltage difference. At position 2 resistor 104 is connected in series with galvanometer 93, while resistors 105, 106, and 107 shunt said galvanometer. At position 3 resistor 109 is in circuit with both the galvanometer and the shunt path, while resistor 110 is in series with the galvanometer only, and resistors 105, 106 and 107 shunt said galvanometer. At position 4 the shunt path comprises resistors 106 and 107 while the galvanometer path includes resistor 113, both paths include resistor 112. At position 5 both paths include resistor 114, the series path includes resistor 115, and the shunt path includes resistor 107. At position 6 resistor 116 is common to both paths with the galvanometer being shunted by conductor 108. In a preferred embodiment of this galvanometer sensitivity device resistors 104, 110, 113, and 115 each have 3,000 ohms resistance. Resistors 109, 112, 114, and 116 each are 500 ohms. Resistor 105 is 400 ohms, resistor 106 is 10 ohms, and resistor 107 is 2 ohms. Thus, it can be seen that the sensitivity of galvanometer 93 is progressively increased as ganged switches 100 and 101 are moved from contact points 6 to contact points 1.

In order to explain the operation of the present computer let it be assumed that the equations are arranged so that $a_1$ is numerically greater than $b_1$, $c_1$, or $d_1$; and so that $b_2$, $c_3$, and $d_4$ also are maximum coefficients in their respective equations. For convenience each equation is divided through by its maximum coefficient leaving:

$$\frac{a_1}{a_1}w + \frac{b_1}{a_1}x + \frac{c_1}{a_1}y + \frac{d_1}{a_1}z = \frac{M_1}{a_1} \qquad (2)$$
$$\frac{a_2}{b_2}w + \frac{b_2}{b_2}x + \frac{c_2}{b_2}y + \frac{d_2}{b_2}z = \frac{M_2}{b_2}$$
$$\frac{a_3}{c_3}w + \frac{b_3}{c_3}x + \frac{c_3}{c_3}y + \frac{d_3}{c_3}z = \frac{M_3}{c_3}$$
$$\frac{a_4}{d_4}w + \frac{b_4}{d_4}x + \frac{c_4}{d_4}y + \frac{d_4}{d_4}z = \frac{M_4}{d_4}$$

which by an obvious substitution of terms can be rewritten as:

$$A_1w + B_1x + C_1y + D_1z = K_1 \qquad (3)$$
$$A_2w + B_2x + C_2y + D_2z = K_2$$
$$A_3w + B_3x + C_3y + D_3z = K_3$$
$$A_4w + B_4x + C_4y + D_4z = K_4$$

The purpose of dividing each equation by its maximum coefficient is to express each coefficient as a fraction equal to or less than unity in order to facilitate setting of the coefficients on the respective potentiometers. The solution to this last set of equations will now be described in detail.

The first step in the solution is to insert the values of the various coefficients on their respective potentiometers, this being accomplished in the following manner: to set the numerical value of $A_1$ on potentiometer $A_1$ the contactor of potentiometer $w$ is set at position 100; switch 60 is positioned on contact point 1; and contactors of potentiometers $x$, $y$, and $z$ each are set at zero. The position of the contactor of potentiometer $K_1$ is set to the numerical value of 100 times the percent value of coefficient $A_1$. The position of the contactor of potentiometer $A_1$ then is moved until a zero deflection is obtained on galvanometer 93, thereby indicating that the voltage drop across potentiometer $K_1$ is equal to the voltage drop taken across potentiometer $A_1$, which establishes a numerical setting for potentiometer $A_1$. Switch 26 is moved to either a positive or negative position depending upon the sign of the coefficient A. Switch 60 then is moved to contact position 2 and the procedure repeated with respect to potentiometers $A_2$ and $K_2$ in order to establish the setting of potentiometer $A_2$. Potentiometers $A_3$ and $A_4$ then are set in a similar manner. In order to set the values on potentiometers $B_1$, $B_2$, $B_3$, and $B_4$ the contactor of potentiometer $x$ is set at 100 and the contactors of potentiometers $w$, $y$, and $z$ each are set at zero. The balancing procedure then is repeated as was done for the A potentiometers. In this manner the various coefficients are set on the A, B, C, and D potentiometers in accordance with the numerical value and positive or negative sign of the coefficients of Equations 3. The numerical values of constants $K_1$, $K_2$, $K_3$, and $K_4$, finally are set directly upon their corresponding potentiometers in network 15. Having thus calibrated the potentiometer, the solution to the set of Equations 3 for the unknown values $w$, $x$, $y$, and $z$ is made in the following manner. Ganged switch 60 is moved to contact points 1 and the contactor of potentiometer $w$ is adjusted until a zero deflection is obtained upon galvanometer 93, which may necessitate a reversal of switch 25 to obtain a balance should the unknown quantity have a negative value. Ganged switch 60 then is moved to contact points 2 and the contactor of potentiometer $x$ is adjusted until a zero deflection is once again obtained upon galvanometer 93. Potentiometers $y$ and $z$ are adjusted in like manner with the ganged switch 60 being on contact points 3 and 4, respectively; and the entire process repeated until no further adjustment is necessary to realize a zero galvanometer deflection at each position. Numerical solutions for the unknowns $w$, $x$, $y$, and $z$ are obtained directly from the position of the contactors of the respective potentiometers on scales 70, 71, 72, and 73, respectively. Each time a reading is taken on galvanometer 93 ganged switch 100 should first be positioned on contact points 6 and progressively moved toward contact points 1 as a final balance position is approached. For maximum sensitivity the final readings should be taken at contact points 1 so that maximum current flows through galvanometer 93.

Although for simplicity of explanation, a four equation system has been chosen for the purpose of illustrating this invention it should be apparent that the invention is in no way limited to solution of sets of four simultaneous equations. Satisfactory results have been obtained in computers adapted to solve ten linear simultaneous equations, although again it should be obvious that the invention is not limited to this number, but rather is capable of solving any number of equations which may be presented. For example, if a set of five simultaneous equations were presented a new E network would be added having potentiometers $E_1$, $E_2$, $E_3$, $E_4$, and $E_5$ together with a calibrated potentiometer $z^1$, corresponding to the $w$, $x$, $y$, and $z$ potentiometers, connected selectively in cascade relationship with the individual E potentiometers. Each of the existing networks 10, 11, 12, 13, and 15 would have an additional potentiometer such as $A_5$, $B_5$, $C_5$, $D_5$, and $K_5$ and switch 60 would have additional contact points 5. If a larger number of equations were presented additional networks and potentiometers would be added in a similar manner. It also should be pointed out that the invention is capable of solving any set of linear simultaneous equations and is in no way restricted to applications in the field of infrared analysis. The computer of this invention is capable of solving many systems of equations which are not initially convergent, but which can be made convergent by multiplying and combining individual equations as is well known to those skilled in the art. Other industrial applications for this computer involve analysis by a mass spectrometer and the computation of components for metallic alloys.

While this invention has been described in connection with a present preferred embodiment thereof, this specification should be considered as descriptive rather than by way of limitation.

Having described our invention, we claim:

1. A computer for solving convergent systems of linear simultaneous equations comprising, in combination; a plurality of electrical networks, each of said networks including a voltage source, a plurality of first potentiometers, first switching means to apply a voltage of selected polarity from said source across the end terminals of each of said first potentiometers, second switching means to reverse selectively the polarity of voltage applied across the end terminals of individual ones of said first potentiometers, a second potentiometer, and third switching means to connect the respective end terminals of said second potentiometer selectively to the contactor and respective first end terminals of individual ones of said first potentiometers; means for summing the voltages appearing between the contactor and first end terminal of the second potentiometer in each of said networks; means for establishing a plurality of reference voltages, one for each of said networks; and means for comparing said summed voltage with respective ones of said reference voltages.

2. A computer for solving convergent systems of linear simultaneous equations comprising, in combination; a plurality of electrical networks, each of said networks including a voltage source, a plurality of first potentiometers, first switching means to apply a voltage of selected polarity from said source across the end terminals of each of said first potentiometers, second switching means to reverse selectively the polarity of voltage applied across the end terminals of individual ones of said first potentiometers, a second precision calibrated potentiometer, and third switching means to connect the respective end terminals of said second potentiometer selectively to the contactor and respective first end terminals of individual ones of said first potentiometers; means for summing the voltages appearing between the contactor and first end terminal of the second potentiometer in each of said networks; means for establishing a plurality of reference voltages, one for each of said networks; and means for comparing said summed voltage with respective ones of said reference voltages.

3. A computer for solving convergent systems of linear simultaneous equations comprising, in combination; a plurality of electrical networks, each of said networks including a voltage source, a plurality of first potentiometers, first switching means to apply a voltage of selected polarity from said source across the end terminals of each of said first potentiometers, second switching means to reverse selectively the polarity of voltage applied across the end terminals of individual ones of said first potentiometers, a second precision calibrated potentiometer, and third switching means to connect the respective end terminals of said second potentiometer selectively to the contactor and respective first end terminals of individual ones of said first potentiometers; means for summing the voltages appearing between the contactor and first end terminal of the second potentiometer in each of said networks; means for establishing a plurality of reference voltages, one for each of said networks, said last-mentioned means comprising a voltage source, a plurality of precision calibrated potentiometers having the end terminals thereof connected across said last-mentioned voltage source; and means for comparing said summed voltages with voltages taken between the contactors and first end terminals of respective ones of said last-mentioned precision calibrated potentiometers.

4. The combination in accordance with claim 3 wherein said means for comparing said summed voltages with voltages taken between the contactors and first end terminals of respective ones of said last-mentioned precision calibrated potentiometer comprises a sensitive galvanometer selectively shunted by resistors of predetermined ohmic values, the current flow through said galvanometer representing differences in potential applied thereacross.

5. A computer for solving convergent systems of linear simultaneous equations comprising, in combination; a plurality of electrical networks, each network including a center-tapped battery, a plurality of first potentiometers, the center tap of said battery being connected to corresponding first end terminals of said first potentiometers, first and second electrical leads, a reversing switch to connect said first and second leads selectively to opposite end terminals of said battery, a plurality of switches to connect the second end terminals of said first potentiometers selectively to said first and second leads, a second potentiometer, one end terminal of said second potentiometer being connected to the center tap of said battery, switching means to connect the second end terminal of said second potentiometer selectively to the contactors of said first potentiometers; means for summing the voltages appearing between the contactor and first end terminal of the second potentiometer in each of said networks; means for establishing a plurality of reference voltages, one for each of said networks; and means for comparing said summed voltage with respective ones of said reference voltages.

6. A computer for solving convergent systems of linear simultaneous equations each of the form having a plurality of additive terms representing known coefficients multiplied by unknown quantities, the sum of said plurality of additive terms being equal to known constants, comprising, in combination; a plurality of electrical networks, one for each corresponding group of additive terms in the equations being solved, each of said networks including a voltage source, a plurality of first potentiometers, the contactor settings of said first potentiometer with respect to corresponding first end terminals thereof representing known coefficients of corresponding additive terms, first switching means to apply a voltage of selected polarity from said source across the end terminals of each of said first potentiometers, second switching means to reverse selectively the polarity of voltage applied across the end terminals of individual ones of said first potentiometers, a second potentiometer, and third switching means to connect the respective end terminals of said second potentiometer selectively to the contactor and respective first end terminals of individual ones of said first potentiometers, the contactor setting of said second potentiometer with respect to one end terminal thereof representing an unknown quantity in said equations being solved; means for summing the voltages appearing between the contactor and first end terminal of the second potentiometer in each of said networks; means for establishing a plurality of reference voltages, each of said reference voltages representing constant terms in a respective one of said equations being solved; and means for comparing said summed voltages with respective ones of said reference voltages.

7. A computer for solving convergent systems of linear simultaneous equations comprising, in combination; a plurality of electrical networks, each network including first and second batteries connected in series relation, a plurality of first potentiometers, corresponding first end terminals of said first potentiometers being connected to the junction between said first and second batteries, first and second electrical leads, switching means to connect said first and second leads selectively to opposite end terminals of said series connected first and second batteries, a plurality of switches to connect the second end terminals of said first potentiometers selectively to said first and second leads, a second potentiometer, one end terminal of said second potentiometer being connected to the center tap of said battery, switching means to connect the second end terminal of said second potentiometer selectively to the contactors of said first potentiometers; means for summing the voltages appearing between the contactor and first end terminal of the second potentiometer in each of said networks; means for establishing a plurality of reference voltages, one for each of said networks; and means for comparing said summed voltage with respective ones of said reference voltages.

References Cited in the file of this patent

UNITED STATES PATENTS

| 2,417,098 | Wilcox | Mar. 11, 1947 |
| 2,468,150 | Wilcox | Apr. 26, 1949 |
| 2,500,997 | Morgan | Mar. 21, 1950 |
| 2,557,070 | Berry | June 19, 1951 |
| 2,584,809 | Oberlin | Feb. 5, 1952 |

OTHER REFERENCES

"A Computer for Solving Similar Equations," J. F. Storm; Proceedings of the National Electronics Conference; volume 5, 1950; pages 98–106.

"The Theory of Mathematical Machines," Francis J. Murray; Kings Crown Press, New York, 1948; pp. III–16, III–17.